(12) United States Patent
Kamiyama (10) Patent No.: US 11,226,060 B2
(45) Date of Patent: Jan. 18, 2022

(54) PIPE REHABILITATION METHOD

(71) Applicant: Shonan Gosei-Jushi Seisakusho K.K., Kanagawa (JP)

(72) Inventor: Takao Kamiyama, Kanagawa (JP)

(73) Assignee: SHONAN GOSEI-JUSHI SEISAKUSHO K.K., Kanagawa (JP)

( * ) Notice: Subject to any disclaimer, the term of this patent is extended or adjusted under 35 U.S.C. 154(b) by 0 days.

(21) Appl. No.: 16/942,905

(22) Filed: Jul. 30, 2020

(65) Prior Publication Data

US 2021/0041050 A1 Feb. 11, 2021

(30) Foreign Application Priority Data

Aug. 5, 2019 (JP) .............................. JP2019-143936

(51) Int. Cl.
*F16L 55/16* (2006.01)
*F16L 55/163* (2006.01)
*F16L 9/22* (2006.01)

(52) U.S. Cl.
CPC .............. *F16L 55/163* (2013.01); *F16L 9/22* (2013.01)

(58) Field of Classification Search
CPC .................................. F16L 55/163; F16L 9/22
USPC ................... 138/97, 98; 405/151, 153, 184.2
See application file for complete search history.

(56) References Cited

U.S. PATENT DOCUMENTS

| | | | | |
|---|---|---|---|---|
| 2,474,172 A | * | 6/1949 | Tinnerman | F16B 9/056 403/252 |
| 3,778,539 A | * | 12/1973 | Baier | F16J 13/02 174/152 R |
| 4,477,204 A | * | 10/1984 | Rohde | E21D 11/083 405/153 |
| 9,797,539 B1 | | 10/2017 | Kamiyama | |
| 2005/0229986 A1 | * | 10/2005 | Kamiyama | F16L 55/163 138/97 |
| 2010/0101674 A1 | * | 4/2010 | Kamiyama | F16L 11/18 138/98 |
| 2010/0307624 A1 | * | 12/2010 | Kamiyama | E03F 3/06 138/98 |
| 2014/0246108 A1 | | 9/2014 | Kamiyama et al. | |

FOREIGN PATENT DOCUMENTS

JP 2014169711 A 9/2014
JP 2017227255 A 12/2017

* cited by examiner

*Primary Examiner* — James F Hook
(74) *Attorney, Agent, or Firm* — Moser Taboada (57) ABSTRACT

Segments are linked in the circumferential direction to assemble a pipe unit. A link bolt is used to link the segments of the pipe unit in the longitudinal direction to assemble a rehabilitation pipe inside an existing pipe. An elastically deformable hollow cylindrical member having a tongue is attached to the link bolt between the inner plates. The outer diameter of the cylindrical member is larger than the insertion hole of the inner plate through which the link bolt can pass. This allows the link bolt to be prevented from falling out of the segment when the link bolt moves in the longitudinal direction due to gravity. When a force is applied to the tongue from below, the cylindrical member is elastically deformed and can be removed from the link bolt.

3 Claims, 10 Drawing Sheets

PIPE REHABILITATION METHOD

CROSS-REFERENCE TO RELATED APPLICATION

The present application is based on priority claimed on Japanese Patent Application No. 2019-143936, filed on Aug. 5, 2019, the contents of which are incorporated herein by reference.

TECHNICAL FIELD

The present invention relates to a pipe rehabilitation method in which segments are linked in the circumferential and longitudinal directions to install a rehabilitating pipe inside an existing pipe, each of the segments being an integrally formed member made from a plastic material, comprising an inner surface plate constituting an inner circumferential surface, and side plates and end plates provided upright on peripheral edges of the inner surface plate.

BACKGROUND ART

In cases in which a pipeline such as a sewage pipe buried underground has deteriorated through aging, a pipe lining method has been proposed and practiced in which a lining is provided to the inner circumferential surface thereof to repair the pipeline without excavating it from the ground.

In cases in which large-diameter pipelines are to be rehabilitated, segments are used each comprising an inner surface plate constituting an inner circumferential surface, side plates and end plates provided upright on the peripheral edges of the inner surface plate, these plates being integrally formed from a plastic material. The segments are linked in the circumferential direction to assemble pipe units, which are then linked in the longitudinal direction using link bolts to construct a rehabilitation pipe inside an existing pipe.

The pipe units are linked in the longitudinal direction in such a manner that the link bolt is passed through insertion holes formed in the side and inner plates of one segment and screwed into a nut that is secured to another segment. In order to prevent the link bolt from falling out of the segment, Patent Document 1 described blow proposes using a temporary lock that temporarily locks the link bolt on the segment. Patent Document 2 described blow further discloses an arrangement in which an elastically deformable clip is fitted to the link bolt to prevent it from falling out of the segment.

PRIOR ART DOCUMENTS

Patent Documents

Patent Document 1: JP 2014-169711 A1
Patent Document 2: JP 2017-227255 A1

SUMMARY OF INVENTION

Problems to be Solved

However, the temporary lock described in Patent Document 1 is a sheet member having an opening formed in the central portion into which the link bolt can be inserted, and frictional resistance generated between the opening and the link bolt is used to lock the link bolt temporarily. Therefore, it is not possible to reliably prevent the link bolt from falling out of the segment with a problem that it is not easy to link the segments in the longitudinal direction.

On the other hand, the clip described in Patent Document 2 could prevent the link bolt from falling if the clip is attached thereto. However, the clip is short in the longitudinal direction, so that the link bolt moves between the inner plates with a problem that the position of the link bolt is not stable.

It is therefore an object of the present invention to solve such problems and provide a pipe rehabilitation method that is capable of preventing the link bolt from falling out of the segment and easily linking the segments in the longitudinal direction.

Means for Solving the Problems

The present invention provides a pipe rehabilitation method in which segments are linked in the circumferential and longitudinal directions to install a rehabilitating pipe inside an existing pipe, each of the segments comprising an inner surface plate, side plates provided upright on both sides of the inner surface plate, end plates provided upright on both ends of the inner surface plate and a plurality of inner plates provided upright on the inner surface plate between the side plates, the method comprising:

securing a plurality of nuts to the inner plate of the segment along the circumferential direction thereof;

inserting a link bolt into insertion holes formed in the side plate and the inner plate of the segment;

fitting into the link bolt between the inner plates for attachment thereto an elastically deformable hollow cylindrical member that has a notch extending in the longitudinal direction and has an outer diameter larger than the insertion hole diameter of the inner plate;

aligning the segment into which the link bolt is inserted with the segment to which the nut is secured; and screwing the link bolt into the nut to link both the segments in the longitudinal direction;

wherein the cylindrical member is attached to the link bolt such that the cylindrical member does not move relative to the link bolt when the link bolt moves in the longitudinal direction due to gravity, while the link bolt moves relative to the cylindrical member when the link bolt is moved in the insertion direction for screwing into the nut.

Effect of the Invention

According to the present invention, the elastically deformable hollow cylindrical member is fitted into the link bolt, and a clamping force in the hollow portion thereof enlarged due to elastic deformation is used to attach the cylindrical member to the link bolt. This allows the link bolt to be surely prevented from falling out of the segment. Furthermore, in the present invention, the longitudinal length of the cylindrical member is equal to or more than half the distance between the inner plates of the segment, or substantially equal to the distance between the inner plates of the segment. This provides an advantage that the link bolt hardly moves between the inner plates, stabilizing the position thereof.

MODE OF CARRYING OUT THE INVENTION

The present invention will now be described with references to embodiments illustrated in the accompanying drawings. The present invention is suitable for rehabilitating or repairing sewage pipes, water supply pipes, tunnels, agricultural irrigation channels, and other existing large-diameter pipes. In the present embodiment, the rehabilitation pipes are described as having a circular cross-section profile orthogonal to the longitudinal direction. However, it shall be apparent that the present invention can be applied to a rehabilitation pipe having a square or another non-circular cross-section. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

Figure 2:
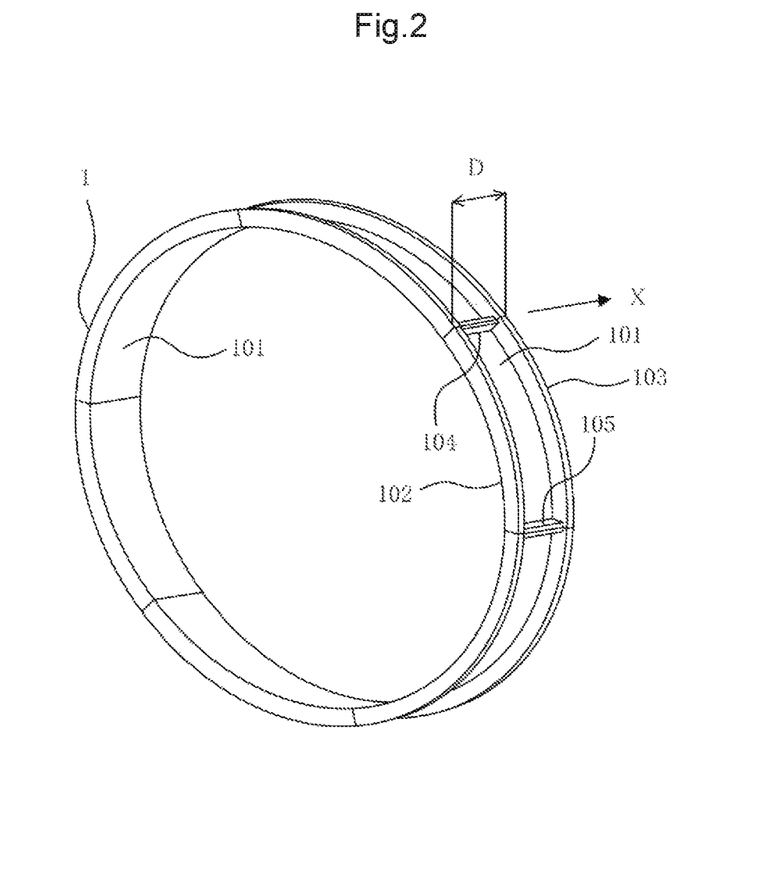
FIG. 2 is a perspective view showing a state in which the segments are linked in the circumferential direction to assemble a pipe unit.

In the present specifications, the longitudinal direction refers to the direction indicated by arrow X extending in the longitudinal direction of a pipe unit 10 in FIG. 2, and the circumferential direction refers to the direction of the circumference of the circle forming the pipe unit 10.

Figure 1:
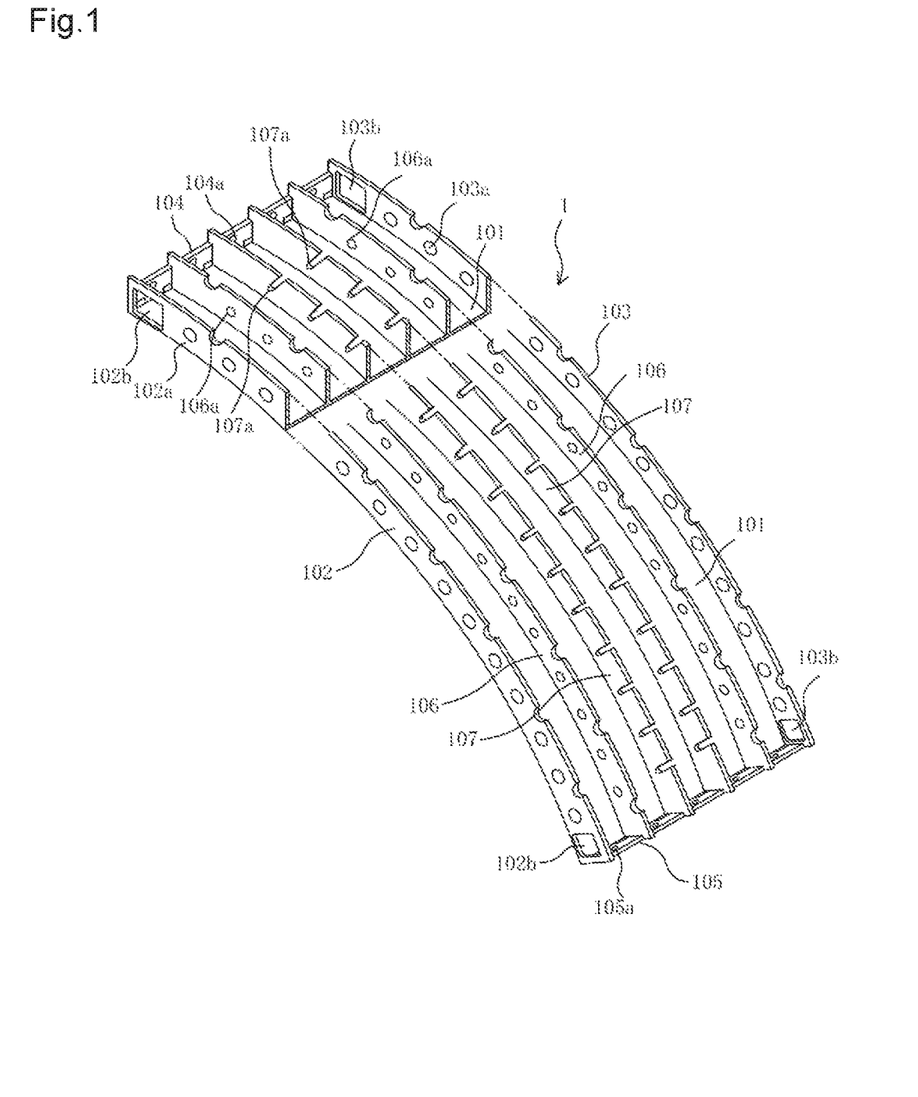
FIG. 1 is a perspective view showing the structure of a segment used in assembling the rehabilitation pipe.

FIG. 1 shows the structure of a segment 1 for pipe rehabilitation (hereafter simply referred to as "segment"). The segment 1 is an integrally formed block-shaped member made from a plastic material, comprising an inner surface plate 101 constituting an inner circumferential surface of the rehabilitation pipe, side plates 102, 103 with the same thickness provided vertically upright on both sides extending in the circumferential direction of the inner surface plate 101, and end plates 104, 105 provided vertically upright on both ends extending in the longitudinal direction of the inner surface plate 101.

In order to reinforce the mechanical strength of the segment 1, a plurality of inner plates 106, 107 having a shape similar to and the same thickness as the side plates 102, 103 are provided upright at equal intervals and parallel thereto on the upper surface of the inner surface plate 101 and on the inside of the side plates 102, 103.

The segment 1 has a shape that is curved as an arc representing a predetermined angle that equally divides the circumference, e.g., a 60° arc that divides the circumference into sixths. However, the segment may be shaped as, e.g., a cuboid or a shape that is bent so as to have a curved right angle depending on the cross-section profile or the size of the existing pipe or the location of the existing pipe to be repaired.

In order to link the segments 1 in the longitudinal direction, a plurality of circular insertion holes 102a, 103a for passing a link bolt 11 and a nut 12 therethrough (FIG. 3) are provided at equal intervals along the circumference on the side plates 102, 103. A plurality of circular insertion holes 106a for passing the link bolt 11 therethrough are also provided at equal intervals on the inner plate 106. A plurality of notches 107a are provided at equal intervals on the inner plate 107 to provide a function as an insertion hole through which the link bolt 11 can pass. The insertion holes 102a, 103a, 106a and the notches 107a are located at coinciding positions along the circumferential direction.

The end plates 104, 105 are disposed between the side plate 102 and the side plate 103. Provided on the end plates 104, 105 are a plurality of circular insertion holes 104a, 105a for passing a linking member such as a link bolt to link the segments 1 in the circumferential direction.

In order to link the segments 1 in the circumferential direction, the end plate 105 of one segment is aligned in contact with the end plate 104 of another segment, and a bolt 6 and a nut 7 (FIG. 3) are positioned at the insertion holes 104a, 105a to threadedly engage the bolt 6 to the nut 7.

By sequentially linking the segments 1 in the circumferential direction around the full circumference, it is possible to assemble a ring-shaped pipe unit 10 having a predetermined length D in the longitudinal direction X as shown in FIG. 2. The outside diameter of the pipe unit 10 is slightly smaller than the inside diameter of the existing pipe to be rehabilitated. In FIG. 2, the inner surface plate 101, the side plates 102, 103, and the end plates 104, 105, which are the principal structural members of the segment 1, are shown. In order to prevent the drawing from becoming complicated, the reinforcement structures such as the inner plates 106, 107 are not shown.

Figure 3:
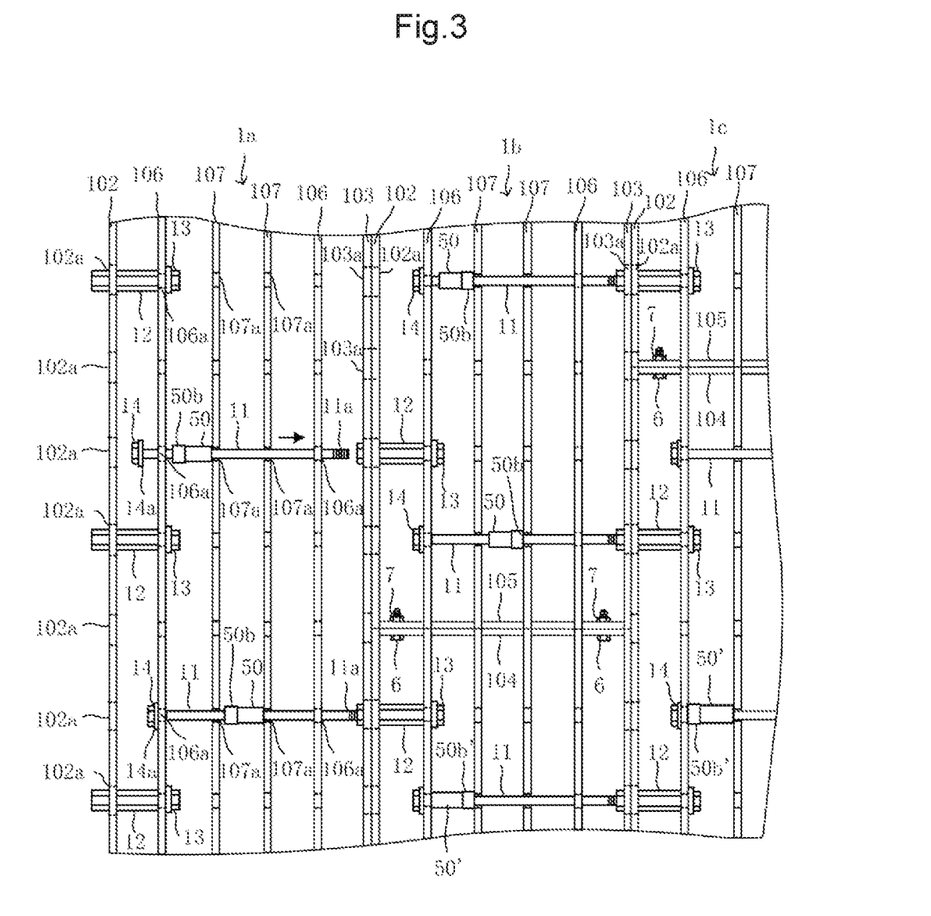
FIG. 3 is an illustrative view showing a state in which link bolts are used to link the segments of the pipe units in the longitudinal direction.

As shown in FIG. 3, the pipe units 10 are sequentially linked in the longitudinal direction. In FIG. 3, a plurality of metallic nuts 12 are secured to the inner plates 106 of the segments 1a, 1b, 1c of the pipe units using bolts 13. The nut 12 is longer in the longitudinal direction than the interval between the side plate 102 and the inner plate 106, and protrudes from the side plate 102 of the segment so long as to be equal to or greater than the thickness of the side plate 103 of another segment. A link bolt 11 extends long in the longitudinal direction, and have at one end a screw part 11a screwed into the nut 12 and at the other end a hexagonal part 14 with a flange 14a.

In FIG. 3, the segments 1c and 1b have already been linked in the longitudinal direction, and the segment 1a is being linked to the segment 1b. When linking the segment 1a to the segment 1b, the nut 12 protruding from the side plate 102 of the segment 1b is passed through the insertion hole 103a in the side plate 103 of the segment 1a, thereby aligning the side plates 103, 102 of the segments 1a, 1b with each other.

The link bolt 11 is then inserted through the insertion hole 102a in the side plate 102 of the segment 1a, the insertion holes 106a in the inner plates 106 and the notches 107a in the inner plates 107, and the screw part 11a thereof is screwed into the nut 12 that is secured to the segment 1b, thereby linking the link bolt 11 to the nut 12. The link bolt 11 is further screwed into the nut 12 until the flange 14a thereof is pressed against the leftmost inner plate 106 of the segment 1a, thereby bolting the segments 1a, 1b in the longitudinal direction. As will be described later, a cylindrical member serving as a lock is attached to the link bolt 11 in FIG. 3 in order to prevent it from falling out of the segment.

The segments of the pipe unit are thus linked in the longitudinal direction to the segments of the already linked pipe units for extension as desired in the longitudinal direction.

To improve linking efficiency, the link bolt is previously inserted into the segments constituting the pipe unit when linking the pipe units in the longitudinal direction, and the pipe unit into which the link bolts are inserted is linked to the pipe units that have already been linked. The link bolt inserted is, however, likely to fall out of the segment. The present embodiment intends to prevent the link bolt from falling out of the segment.

Figure 4:
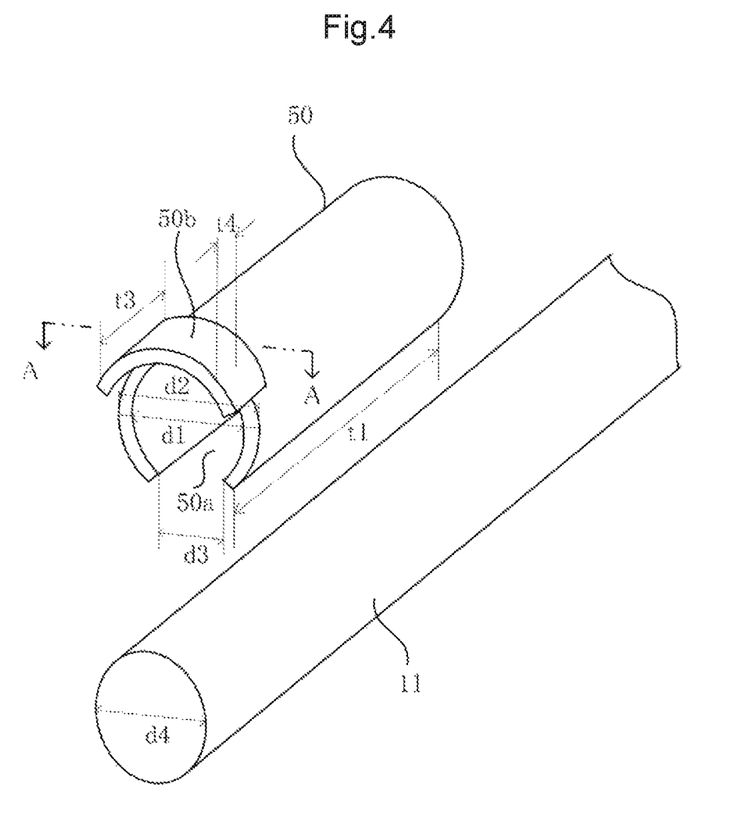
FIG. 4 is a perspective view showing the cylindrical member and the link bolt.
Figure 5:
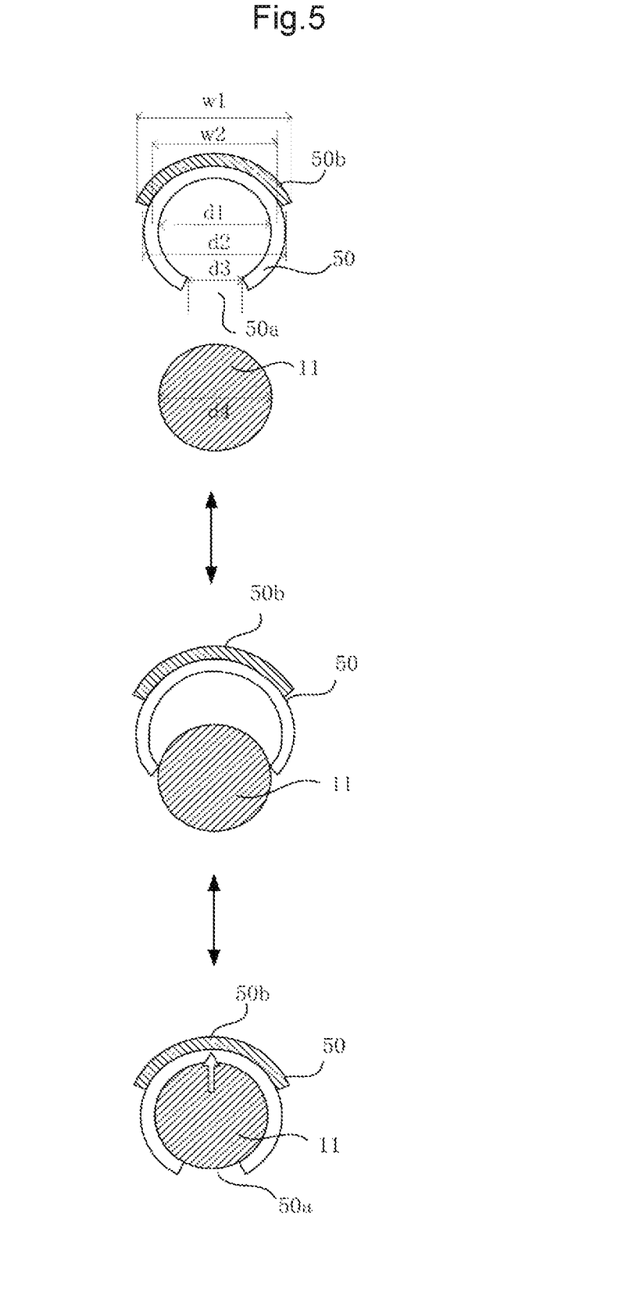
FIG. 5 is an illustrative view showing steps of attaching the cylindrical member to the link bolt in a cross section along the line A-A in FIG. 4.

As shown in FIGS. 4 and 5, a cylindrical member 50 made of a plastic such as polyethylene or polypropylene is used as such a member to prevent the falling. The cylindrical member 50 is a hollow elastically deformable member having a length t1 in the longitudinal direction (the direction along which the pipe extends), an inner diameter d1 and an outer diameter d2. The cylindrical member 50 has at the lower portion over the entire length a notch 50a having a length t1 in the longitudinal direction and a width d3 when viewed in a direction orthogonal to the longitudinal direction. The outer diameter d2 of the cylindrical member 50 is larger than the respective diameters of the insertion hole 106a of the inner plate 106 and the notch 107a of the inner plate 107, so that the cylindrical member 50 cannot pass through the insertion hole or the notch.

In this embodiment, the inner diameter d1 of the cylindrical member 50 is the same as or slightly smaller than the outer diameter d4 of the link bolt 11. The length t1 of the cylindrical member 50 is shorter than the distance t2 between the side plate 102 (103) of the segment 1 and the inner plate 106 adjacent thereto or the distance t2 between the inner plates 106 and 107 (FIG. 7a) and is t2/2 or more.

The notch 50a of the cylindrical member 50 has the width d3 corresponding to a size of ⅙ to ⅖ arc of the cross-sectional circle of the link bolt 11 that allows the cylindrical member 50 to be elastically deformed in the radial direction and fitted into the link bolt 11 through the notch 50a. Furthermore, the cylindrical member 50 has the wall thickness (d2−d1)/2 equal in any radial direction and is elastically deformed to increase the diameter so large as to allow the cylindrical member 50 to be fitted into the link bolt 11.

A tongue 50b extending in the longitudinal direction beyond the cylindrical member 50 is formed integrally therewith at a position radially opposite the notch 50a at the upper end of the cylindrical member 50. The tongue 50b has the same wall thickness as that of the cylindrical member 50 with its outer and inner peripheral surfaces curved in an arc shape. The inner peripheral surface of the tongue 50b and the outer peripheral surface of the cylindrical member 50 are flush with each other. The centers of curvature of the circular arcs of the outer and inner peripheral surfaces of the tongue 50b coincide with the center of the cross-sectional circle of the cylindrical member 50. The tongue 50b has a length t3 in the longitudinal direction and extends forward from the distal end of the cylindrical member 50 by a distance t4 such that the operator can exert a force on the tongue 50b from below by hand or tool. The added length (t1+t4) of the extension distance t4 of the tongue 50b from the distal end of the cylindrical member 50 and the length t1 thereof is set shorter than the distance t2 between the inner plates 106 and 107 (FIG. 7a). The circumferential width w1 (FIGS. 5 and 6) of the tongue 50b is set larger than the circumferential width w2 (FIG. 6) of the notch 107a of the inner plate 107 and the diameter of the insertion hole 106a of the inner plate 106, so that the tongue 50b has a size that is so large that it cannot pass through the insertion hole 106a or the notch 107a.

FIG. 5 shows how the cylindrical member 50 is attached to the link bolt 11. The upper part of FIG. 5 is a cross-sectional view taken along the line A-A of FIG. 4. As shown in the middle part of FIG. 5, the cylindrical member 50 is pushed through the notch 50a against the link bolt 11. This causes the cylindrical member 50 to elastically deform and enlarge in diameter. The cylindrical member 50 is further pushed in and fitted into the link bolt 11 as shown in the lower part of FIG. 5. The outer diameter d4 of the link bolt 11 is the same as or slightly larger than the inner diameter d1 of the cylindrical member 50, so that the cylindrical member 50 holds the link bolt 11 almost all around at the hollow portion that is enlarged due to elastic deformation. This assures that the cylindrical member is firmly attached to the link bolt 11. In this case, the longitudinal length of the cylindrical member 50 is half or more of the distance between the inner plates, it is possible to reliably suppress the longitudinal movement of the link bolt 11 relative to the segment.

The cylindrical member 50 is attached to the link bolt 11 with a predetermined clamping force depending on elastic deformation. The clamping force is determined such that the cylindrical member 50 does not move relative to the link bolt 11 when the link bolt 11 moves in the longitudinal direction due to gravity and the cylindrical member 50 or the tongue 50b hits either of the inner plates 106, 107, while the link bolt 11 moves relative to the cylindrical member 50 when the link bolt 11 is moved in the insertion direction for screwing into the nut 12 and the cylindrical member 50 or the tongue 50b hits the inner plate 106 or 107.

On the other hand, a force is, as shown by the arrow, applied upwardly from the side of the link bolt 11 to the tongue 50b in the state shown in the lower part of FIG. 5. At this time, the cylindrical member 50 is lifted as shown in the middle part of FIG. 5, and elastically deformed in the direction of enlarging in diameter, so that the cylindrical member 50 can be removed from the link bolt 11 as shown in the upper part thereof.

Figure 10:
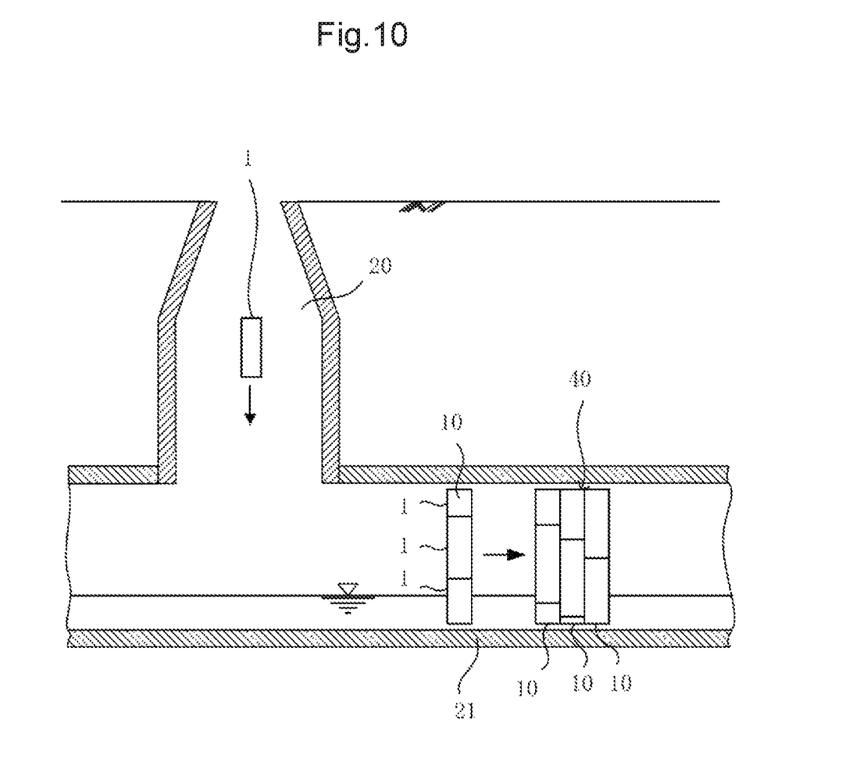
FIG. 10 is an illustrative view showing a state in which the pipe units are assembled to install the rehabilitation pipe inside the existing pipe.

In such a configuration, a process of installing a rehabilitation pipe inside an existing pipe will be described. First, as shown in FIG. 10, the segment 1 is carried through a manhole 20, and, as shown in FIG. 2, the segments 1 are sequentially linked in the circumferential direction inside the manhole 20 to assemble the pipe unit 10. The nuts 12 may be secured to the inner plate of the segment 1 along the circumferential direction before or after the segment 1 is carried into the manhole 20.

Figure 7A:
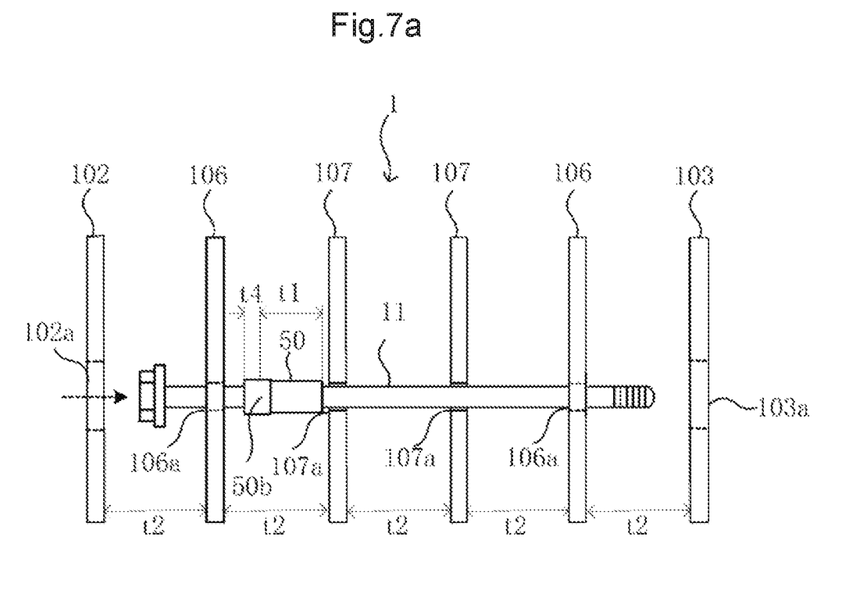
FIG. 7a is a top view showing a state in which the cylindrical member is attached to the link bolt.
Figure 7B:
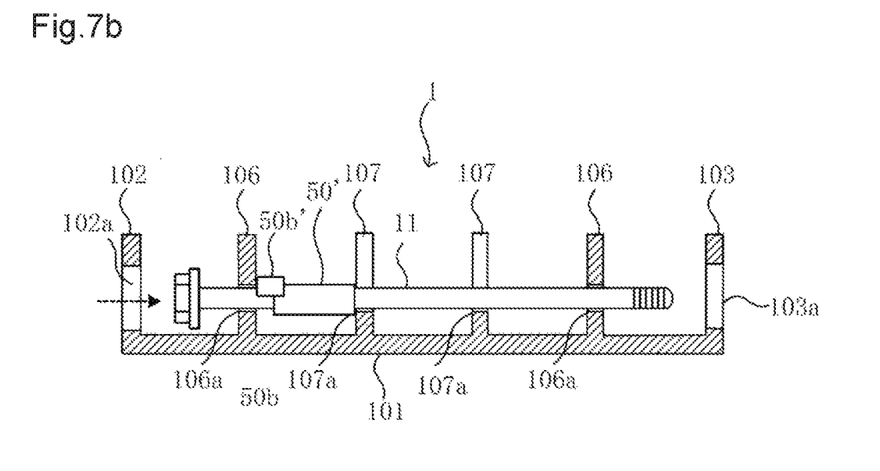
FIG. 7b is a side view showing a state in which the cylindrical member is attached to the link bolt.

Next, the pipe units 10 are linked in the longitudinal direction using the link bolt 11. As shown in FIGS. 7a and 7b, the link bolt 11 is inserted into the insertion holes 102a, 106a of the side plate 102 and the inner plates 106 of the segment 1 and the notches 107a of the inner plates 107 thereof.

Figure 6:
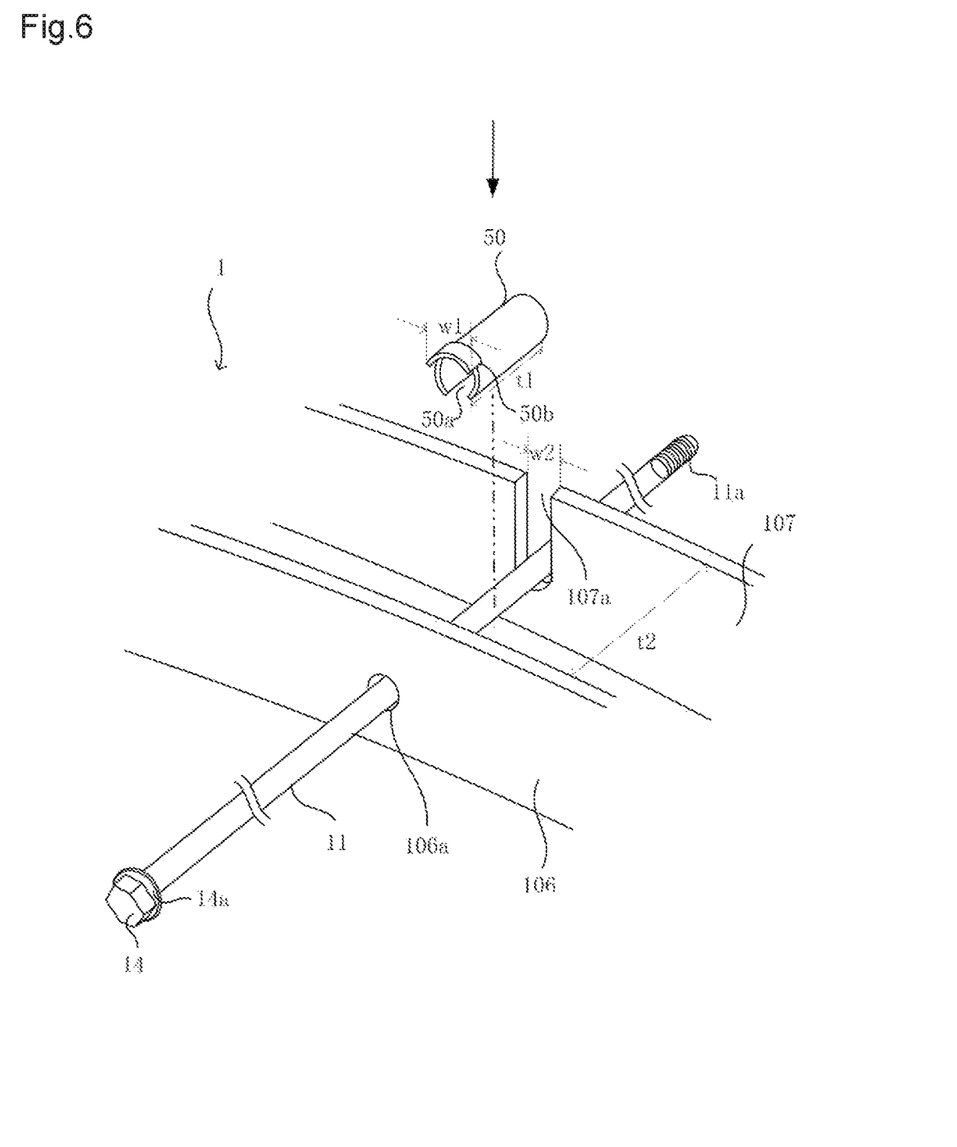
FIG. 6 is a perspective view showing in what manner the cylindrical member is attached to the link bolt.

Subsequently, as shown in FIGS. 5 and 6, the cylindrical member 50 is attached to the link bolt 11. The cylindrical member 50 may be disposed between the inner plates 106 and 107, or between the inner plates 107 and 107 with the tongue 50b on the right or left side. All the cylindrical members may be attached to the link bolt 11 in the same position and direction, or randomly attached thereto in any position and direction (FIG. 3).

As shown in the lower part of FIG. 5, the cylindrical member 50 elastically contracts so as to clamp the entire circumference of the link bolt 11. It is therefore possible to attach the cylindrical member 50 to the link bolt 11 with a predetermined clamping force depending on elastic deformation. The cylindrical member 50 doesn't move relative to the link bolt 11 when the link bolt 11 moves in the longitudinal direction due to gravity and the cylindrical member 50 or its tongue 50b hits the inner plates 106 and 107. In addition, the outer diameter d2 of the cylindrical member 50 or the circumferential width w1 of the tongue 50b is larger than the insertion holes 106a or the notches 107a of the inner plates 106 and 107, so that the cylindrical member 50 and the tongue 50b cannot pass therethrough. This allows the link bolt 11 to be surely prevented from falling out of the segment 1.

The insertion of the link bolt 11 into the segment 1 and the attachment of the cylindrical member 50 to the link bolt 11 may be performed before the segment 1 is carried into the manhole 20 or before the pipe units 10 are assembled in the manhole 20. The link bolt 11 is, for example, inserted into the insertion holes 102a, 106a of the segment 1 after it has been manufactured, and the segment 1 with the cylindrical member 50 attached to the link bolt 11 is stored in a storage box in preparation for transportation to a work site. The link bolt 11 can be prevented from falling out of the segment 1 while storing the segment in the storage box or while carrying it to the work site. This allows the segments to be efficiently linked in the longitudinal direction.

As shown in FIG. 3, the segment into which the link bolt 11 is inserted is brought into alignment with the segment to which the nut 12 is secured, and the link bolt 11 is screwed into the nut 12 to link both the segments in the longitudinal direction. When the link bolt 11 is moved in the longitudinal direction for screwing to the nut 12, the longitudinal pressing force to be exerted on the link bolt 11 is made stronger if the cylindrical member 50 hits the inner plates 106, 107. This allows the link bolt 11 to be moved relative to the cylindrical member 50, ensuring that the link bolt 11 is screwed smoothly into the nut 12.

As described above, the insertion of the link bolt 11 into the segment and the attachment of the cylindrical member 50 to the link bolt 11 are performed before the segment 1 is carried into the manhole or before the pipe unit 10 is assembled in the manhole 20. In that case, the insertion of the link bolt and the attachment of the cylindrical member 50 are likely to be performed in erroneous positions. However, in the present embodiment, the operator can exert an upward force on the tongue 50b from the side of the link bolt 11 by hand or using a flat plate or pin-shaped tool, as shown by the arrow in the lower part of FIG. 5. This allows the cylindrical member 50 to be removed from the link bolt 11 as shown in the upper part of FIG. 5. Therefore, the link bolt 11 can be pulled out from the segment for change into a correct position, and the segments can be linked again in the longitudinal direction, facilitating the redoing of the linking work.

The pipe units 10 are sequentially linked in the longitudinal direction to install a rehabilitation pipe 40 inside the existing pipe 21. A filler such as a grout material (not shown) is then injected into a space between the rehabilitation pipe 40 and the existing pipe 21. The cylindrical member 50 attached to the link bolt 11 including the tongue 50b does not exceed the height of the inner plates 106 and 107, and is embedded in the filler. By hardening the filler, it is possible to construct a composite pipe comprising the existing pipe, the filler and the rehabilitation pipe.

Figure 9:
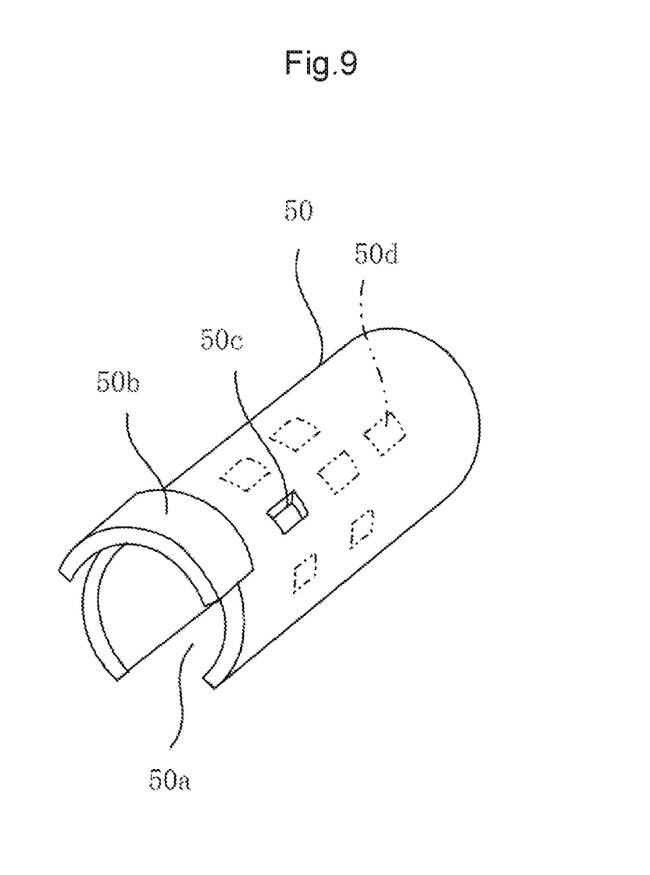
FIG. 9 is a perspective view showing a cylindrical member according to still another embodiment.

In the above-described embodiment, the tongue 50b is formed on the cylindrical member 50 such that it can be removed from the link bolt 11. However, as shown in FIG. 9, in addition to the tongue 50b or instead thereof, a recess 50c may be provided on the peripheral surface, which is capable of elastically deforming in the direction of enlarging the diameter of the cylindrical member 50 by exerting a force thereon from the outside. In this embodiment, the recess 50c is formed as a hole penetrating the cylindrical member 50 in a rectangular shape. When a pin-shaped tool is inserted into the recess 50c and an upward force is applied to the cylindrical member 50, it elastically deforms and enlarges in diameter, so that the cylindrical member 50 can be removed from the link bolt 11. Not only one such recess 50c but also a plurality of recesses 50c can be provided as indicated by the virtual line 50d.

Figure 8A:
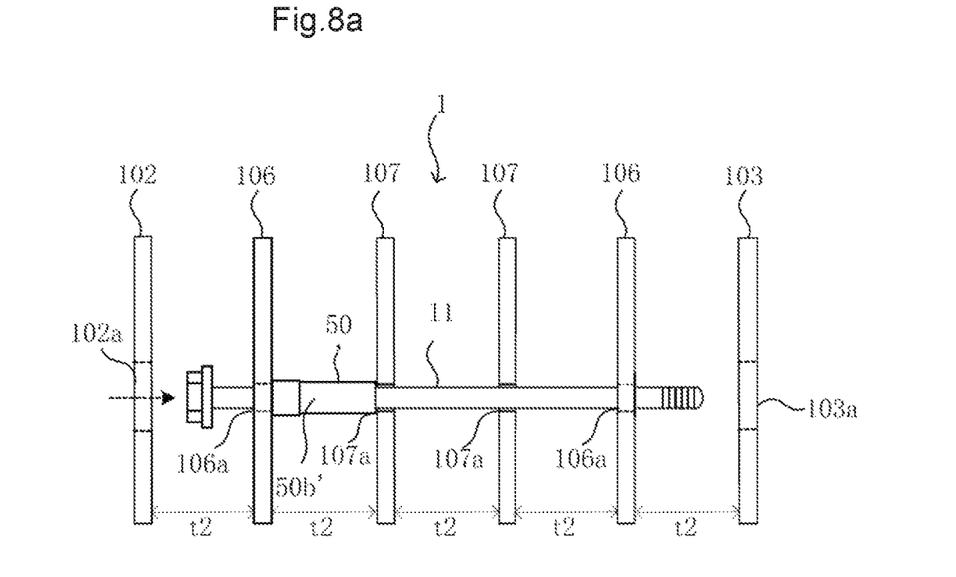
FIG. 8a is a top view showing a state in which a cylindrical member according to another embodiment is attached to the link bolt.
Figure 8B:
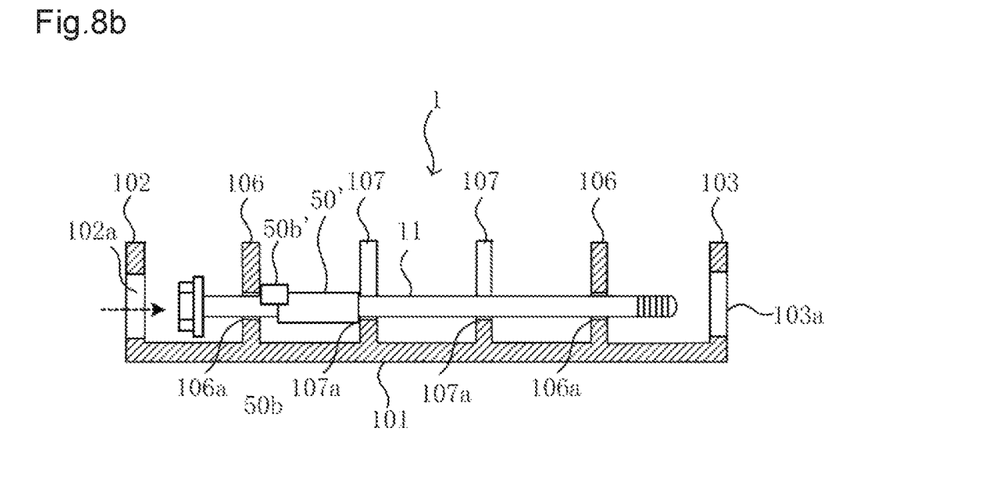
FIG. 8b is a side view showing a state in which a cylindrical member according to another embodiment is attached to the link bolt.

As shown in FIGS. 8a and 8b, the longitudinal length of the cylindrical member 50' including the tongue 50b' may be set to a length corresponding to the distance between the inner plates 106, 107 of the segment such that both ends thereof can be brought into contact with or close to the inner plates 106, 107. With such a configuration, the link bolt 11 hardly moves between the inner plates even if gravity acts thereon, allowing the link bolt 11 to be held in a more stable state.

The cylindrical member 50, 50' is attached to the link bolt 11 between the first inner plates 106, 107 as viewed in the longitudinal direction, but may be attached between the middle inner plates 107, 107 or between the last inner plates 107, 106.

The present invention is applicable not only to a pipe rehabilitation method, but also to a shield construction method for performing an inner volume secondary lining after shielding.

KEY TO THE SYMBOLS 1 segment
10 pipe unit
11 link bolt
12 nut
20 manhole
21 existing pipe
40 rehabilitation pipe
50, 50' cylindrical member
50a notch
50b, 50b' tongue
101 inner surface plate
102, 103 side plate
104, 105 end plate
106, 107 inner plate

The invention claimed is:

1. A pipe rehabilitation method in which a plurality of segments are linked in circumferential and longitudinal directions to install a rehabilitating pipe inside an existing pipe, each of the segments comprising an inner surface plate, side plates provided upright on both sides of the inner surface plate, end plates provided upright on both ends of the inner surface plate and a plurality of inner plates provided upright on the inner surface plate between the side plates, the method comprising:

securing a plurality of nuts to one inner plate of the plurality of inner plates of a first segment of the plurality of segments along the circumferential direction thereof;

inserting a link bolt into insertion openings formed in one of the side plates and the plurality of inner plates of a second segment of the plurality of segments;

fitting onto the link bolt, between adjacent inner plates of the plurality of inner plates of the second segment, an elastically deformable hollow cylindrical member that includes a cylindrical hollow portion having an inner diameter that is the same or slightly smaller than an outer diameter of the link bolt, having an outer diameter that is larger than a diameter of the insertion openings, and having a notch that extends over an entire length of the cylindrical hollow portion, and wherein the hollow cylindrical member also includes a tongue that is formed at one end of the cylindrical hollow portion on an upper side thereof radially opposite the notch and protrudes from the one end of the cylindrical hollow portion in a direction along which the cylindrical hollow portion extends;

aligning the second segment into which the link bolt is inserted with the first segment to which the nut is secured;

screwing the link bolt into the nut to link both the first and second segments in the longitudinal direction, wherein the cylindrical member is attached to the link bolt such that the cylindrical member does not move relative to the link bolt when the link bolt moves in the longitudinal direction due to gravity, while the link bolt moves relative to the cylindrical member when the link bolt is moved in the longitudinal direction toward the first segment to which the nut is secured and the hollow cylindrical member engages one of the adjacent inner plates, and when a force is applied on the tongue from the side of the link bolt to lift the cylindrical member so that the link bolt passes through the notch, the cylindrical member elastically deforms and the inner diameter of the cylindrical hollow portion enlarges such that the cylindrical member can be removed from the link bolt.

2. A pipe rehabilitation method according to claim 1, wherein the cylindrical member including the tongue has a length corresponding to at least half a distance between the adjacent inner plates of the second segment.

3. A pipe rehabilitation method according to claim 1, wherein the cylindrical member including the tongue has a length that corresponds to a distance between the adjacent inner plates of the second segment.

* * * * *